Jan. 8, 1952        S. D. BRADLEY        2,581,574
WEATHER STRIP
Filed Jan. 28, 1948
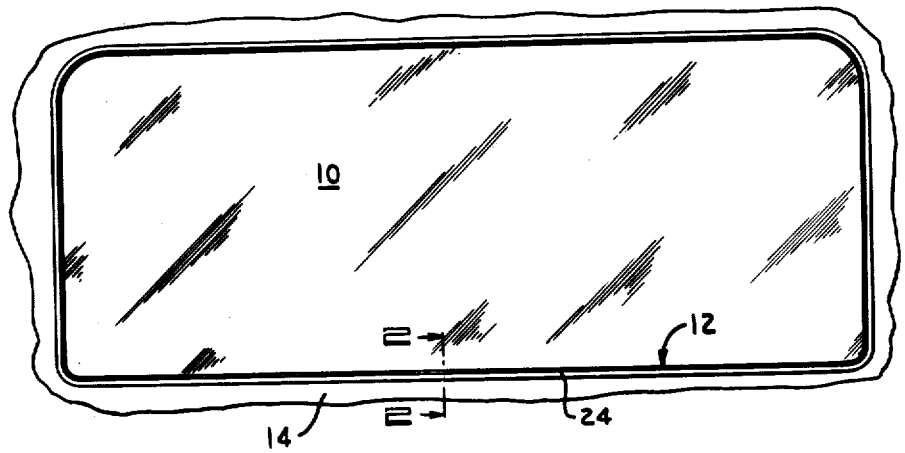
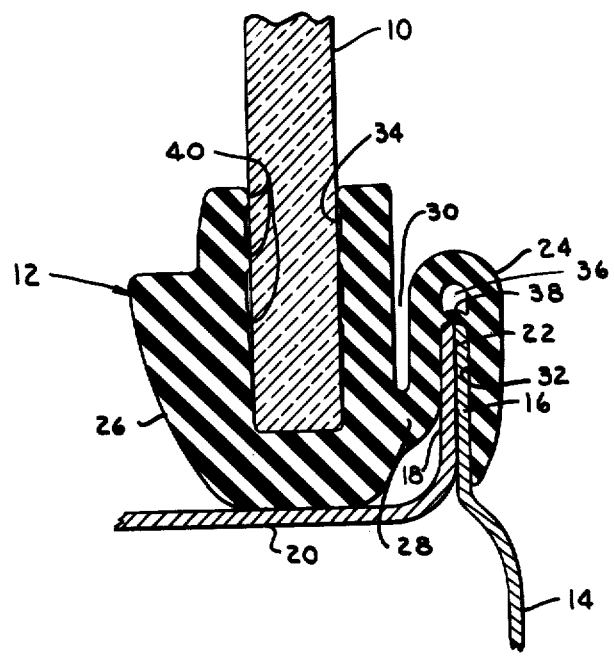
INVENTOR.
STEPHEN D. BRADLEY
BY
ATTORNEY Patented Jan. 8, 1952

2,581,574

UNITED STATES PATENT OFFICE 2,581,574

WEATHER STRIP

Stephen D. Bradley, Detroit, Mich., assignor to Detroit Macoid Corporation, a corporation of Michigan Application January 28, 1948, Serial No. 4,739

8 Claims. (Cl. 20—56.4)

1

The present invention relates to an improved weatherstrip which is particularly but not exclusively adapted to provide a cushioning support and weather seal between an automobile window or windshield glass and the body of the automobile.

A conventional construction in automobile window or windshield frames is formed by joining a sheet metal window frame flange provided by the outer metal portions of the automobile body, face to face with a similar sheet metal window frame flange provided by the interior metal portions of the automobile body. The two flanges provide a double thickness sheet metal frame which generally forms the opening for the window or windshield and has a slight crack around its inner peripheral edge between the two aforesaid flanges. The latter are normally welded together at points around the inner periphery of the frame opening. Between the welded portions, a sealer has been required prior to the present invention to prevent leakage of water through the crack between the adjacent flanges and into the interior of the automobile body.

A primary object of the present invention is to provide improvements in a weatherstrip which eliminates the requirement of a sealer for the crack between the adjacent window frame flanges, thereby simplifying the window sealing assembly and avoiding the expense of a special sealing operation. To this end, the present invention proposes a grooved resilient weatherstrip member adapted to receive the interior peripheral edge portions of the window frame and providing a thin longitudinally extending web of elastic deformable material integral with opposite interior sidewalls of the groove and spaced from the bottom thereof to provide a tubular air space between the web and the base of the groove. Upon insertion of the window frame into the groove provided therefor by the weatherstrip, the web is stretched across and pressed against the edges of the two frame flanges to close the crack therebetween as a waterproof seal.

Another object of the present invention is to provide an improved combined cushioning supporting frame and weatherseal between a glazing unit and a supporting structure which permits adjustment of the weatherstrip for minor varia-

2 tions in the dimensions of the glazing unit and the window opening and the desired spacing between the glazing unit and the supporting structure.

Other objects of this invention will appear in the following description and appended claims, reference being had to the accompanying drawings forming a part of this specification wherein like reference characters designate corresponding parts in the several views.

In the drawings:

Fig. 1 is a fragmentary elevation showing the exterior side of an automobile windshield mounted in an automobile body by the combined supporting frame and weatherstrip of the present invention.

Fig. 2 is an enlarged fragmentary section taken in the direction of the arrows along the line 2—2 of Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is described by way of example in reference to the drawings, wherein Fig. 1 shows an automobile window glazing unit 10 joined by the weatherstrip, indicated generally by the numeral 12, at a weatherproof seal to the sheet metal edges of the windshield opening provided in the automobile body.

The outer metal automobile body portion 14 provides the outer sheet metal window frame flange 16, Fig. 2, which extends around the opening for the window. A mating internal sheet metal window frame flange 18 provided by the internal metal automobile body portions 20 is joined face to face with the outer flange 16, so as to complete a double thickness frame extending generally around the window opening and having the crack 22 between the two flanges 16 and 18. Normally the flanges 16 and 18 are spot welded together at intervals around the periphery of the frame 16—18. Prior to the present invention, it has been necessary to seal the portions of the crack 22 between the welds by a suitable sealing material to prevent leakage of water into the automobile interior. As will be apparent below, the weatherstrip of the present invention simplifies the window sealing assembly and obviates the requirement of a special sealing operation to fill the crack 22.

The weatherstrip of the present invention preferably comprises an elastic deformable material, such as rubber or rubber-like plastic material, and may be suitably formed by conventional extrusion methods. Two parallel longitudinal grooved strips 24 and 26 are flexibly joined side by side and spaced by the strip 28 which is integral with the inner side of the strip 24 near the mouth of the groove 32 thereof and the adjacent side of the strip 26 near the base of the groove 34 thereof. The groove 30 between the adjacent sides of the strips 24 and 26 increases the flexibility of the connecting strip 28, so as to facilitate minor adjustment of the overall weatherstrip to the desired spacing between the frame 16—18 and the glazing unit 10 when the weatherstrip is assembled with the edge portions of the frame 16—18 within the groove 32 and with the edge portions of the glazing unit 10 inserted within the groove 34.

Extending longitudinally of the groove 32 and spaced from the bottom thereof to provide the tubular air space 36 is the thin elastic web 38 integral with the interior sidewalls of the groove 32. As may be observed from Fig. 2, the thin web 38 is stretched tightly across the peripheral edge portions of the frame 16—18, when the latter are inserted into the groove 32, and effectively seal the crack 22 with a weatherproof seal without depending on deformation of the relatively thick base and sidewall portions of the strip 24. The latter are less flexible so as to resist deformation and are relatively thick to provide the required strengths necessary to hold the strip in place. They cannot in themselves therefore provide an adequate weatherproof seal for the crack 22. Thus, by virtue of the secondary bottom or web 38 for the groove 32, the base and sidewalls of the groove 32 may be maintained relatively thick and heavy so as to provide a firm gripping contact with the peripheral edges of the frame 16—18 inserted therein.

In the above connection, it is preferred that the sidewalls of the grooves 32 and 34 converge toward their respective groove openings in their normal relaxed positions. Thus, when the glazing unit 10 and frame 16—18 are inserted into the respective grooves 34 and 32, the sidewalls of the corresponding grooved strips 26 and 24 will resiliently grip the inserted edge portions.

In order to provide an adequate cushioning support for the relatively heavy glazing unit 10, the body of the strip 26 is relatively thick and heavy compared to the corresponding body of the strip 24. Also, the interior walls of the groove 34 provide the plurality of longitudinally extending sealing ridges 40 which firmly grip the adjacent surfaces of the inserted edges of the glazing unit 10 and effect a waterproof seal therewith.

From the foregoing, an improved weatherstripping has been disclosed which provides a cushioning support and weatherproof seal between a glazing unit and the edge portions of the opening to be glazed, and which provides an improved weather seal for any crack or joint therein. It is to be observed that the feature of the elastic web 38, providing in essence a double base for the frame receiving groove, need not be confined to use with automobile window constructions. The web construction of the present invention may be suitably employed in any application in which a weatherproof seal is desired within a groove which is adapted to receive the edge portions either of the glazing element or of the supporting frame therefor.

Having thus described my invention, I claim:

1. In a weatherstrip having a groove for receiving the edge portions of an insert, means to provide a weatherproof seal at the said insert edge portions when the latter are inserted into said groove and including a web of elastic deformable material disposed between the interior sides of said groove and spaced from the bottom thereof, said web having substantially greater flexibility than the side portions of said weatherstrip.

2. A weatherstrip as claimed in claim 1 and being further characterized in that said web extends longitudinally within said groove and is integral with said interior sides thereof and is spaced from the bottom thereof to form a tubular air space between said web and the bottom of said groove.

3. In a weatherstrip having a body of elastic deformable material, the combination of a groove within said body to receive the edge portions of a glazing unit, a second groove within said body to receive the edge portions of a frame member, and a web of elastic deformable material joining opposite interior sides of said second groove and spaced from the bottom thereof, said web having substantially greater flexibility than the sides of said body.

4. The combination as claimed in claim 3 and being further characterized in that said two grooves are disposed essentially side by side and open in opposite directions from each other.

5. In a weatherstrip, the combination of a longitudinal cushioning body portion having a longitudinal groove with relatively heavy wall portions of elastic deformable material to receive and support the edge portions of a glazing unit, a longitudinal strip of elastic deformable material extending parallel to said cushioning body portion and providing a second groove to receive the edge portions of an integral window frame member, and a flexible connection between the adjacent sidewalls of said two grooves, said flexible connection having substantially greater flexibility than the side walls of said grooves.

6. The combination as claimed in claim 5 and being further characterized in that means are provided to form a weatherproof seal at the edge portions of a frame member inserted into said second groove and include a web of elastic deformable material disposed between the interior sides of said second groove and spaced from the bottom thereof.

7. The combination as claimed in claim 5 and being further characterized in that said two grooves extend essentially side by side and open in essentially opposite directions from each other, and in that said flexible connection between the adjacent sidewalls of said two grooves comprise a strip of said elastic deformable material spacing the adjacent sides of said grooves and joining the side of said second groove near the mouth thereof with the side of said first named groove near the bottom thereof.

8. The combination as claimed in claim 7 and being further characterized in that means are provided to form a weatherproof seal at the edge portions of a frame inserted into said second groove and include a web of elastic deformable material integral with the interior sides of said groove and spaced from the bottom thereof to form a tubular air space between said bottom and said web.

STEPHEN D. BRADLEY.

REFERENCES CITED

The following references are of record in the file of this patent:

UNITED STATES PATENTS

| Number | Name | Date |
|---|---|---|
| 2,078,731 | Norris | Apr. 27, 1937 |
| 2,093,614 | Lynch | Sept. 21, 1937 |
| 2,126,167 | Breackevelt | Aug. 9, 1938 |
| 2,247,933 | Willer | July 1, 1941 |
| 2,278,348 | Dutfield | Mar. 31, 1942 |
| 2,354,341 | Verhagen | July 25, 1944 |

FOREIGN PATENTS

| Number | Country | Date |
|---|---|---|
| 100,311 | Australia | 1937 |

---

Certificate of Correction

Patent No. 2,581,574 January 8, 1952

STEPHEN D. BRADLEY

It is hereby certified that error appears in the printed specification of the above numbered patent requiring correction as follows:

Column 4, line 50, for "an integral" read *a*; line 51, for "a" read *an integral*; and that the said Letters Patent should be read as corrected above, so that the same may conform to the record of the case in the Patent Office.

Signed and sealed this 20th day of May, A. D. 1952.

[SEAL]

THOMAS F. MURPHY,
*Assistant Commissioner of Patents.* provided to form a weatherproof seal at the edge portions of a frame inserted into said second groove and include a web of elastic deformable material integral with the interior sides of said groove and spaced from the bottom thereof to form a tubular air space between said bottom and said web.

STEPHEN D. BRADLEY.

REFERENCES CITED

The following references are of record in the file of this patent:

UNITED STATES PATENTS

| Number | Name | Date |
|---|---|---|
| 2,078,731 | Norris | Apr. 27, 1937 |
| 2,093,614 | Lynch | Sept. 21, 1937 |
| 2,126,167 | Breackevelt | Aug. 9, 1938 |
| 2,247,933 | Willer | July 1, 1941 |
| 2,278,348 | Dutfield | Mar. 31, 1942 |
| 2,354,341 | Verhagen | July 25, 1944 |

FOREIGN PATENTS

| Number | Country | Date |
|---|---|---|
| 100,311 | Australia | 1937 |

Certificate of Correction

Patent No. 2,581,574 January 8, 1952

STEPHEN D. BRADLEY

It is hereby certified that error appears in the printed specification of the above numbered patent requiring correction as follows:

Column 4, line 50, for "an integral" read *a*; line 51, for "a" read *an integral*;

and that the said Letters Patent should be read as corrected above, so that the same may conform to the record of the case in the Patent Office.

Signed and sealed this 20th day of May, A. D. 1952.

[SEAL]

THOMAS F. MURPHY,
*Assistant Commissioner of Patents.*

Certificate of Correction

Patent No. 2,581,574 January 8, 1952

STEPHEN D. BRADLEY

It is hereby certified that error appears in the printed specification of the above numbered patent requiring correction as follows:

Column 4, line 50, for "an integral" read *a*; line 51, for "a" read *an integral*; and that the said Letters Patent should be read as corrected above, so that the same may conform to the record of the case in the Patent Office.

Signed and sealed this 20th day of May, A. D. 1952.

[SEAL]

THOMAS F. MURPHY,
*Assistant Commissioner of Patents.*